United States Patent [19]

Jansson et al.

[11] 4,269,568

[45] May 26, 1981

[54] STAY RING FOR THE SPIRAL CASING OF A ROTARY HYDRAULIC MACHINE

[75] Inventors: Erik O. Jansson; Bengt O. Naucler; Thomas Asberg, all of Kristinehamn, Sweden

[73] Assignee: Aktiebolaget Karlstads Mekaniska Werkstad, Kristinehamn, Sweden

[21] Appl. No.: 86,998

[22] Filed: Oct. 22, 1979

Related U.S. Application Data

[63] Continuation of Ser. No. 835,719, Sep. 22, 1977, abandoned.

[30] Foreign Application Priority Data

Sep. 28, 1976 [SE] Sweden ............................... 7610761

[51] Int. Cl.$^3$ ............................................. F01D 25/24
[52] U.S. Cl. ................................. 415/204; 415/219 C
[58] Field of Search ............... 415/184, 186, 191, 203, 415/204, 205, 207, 208, 217, 219 C, 500; 29/156.4 R, 156.8 R, 156.8 CF; 60/696; 417/405

[56] References Cited

U.S. PATENT DOCUMENTS

| | | | |
|---|---|---|---|
| 1,741,254 | 12/1929 | Syvertsen | 415/219 C |
| 2,410,201 | 10/1946 | Corby | 415/219 C |
| 3,204,931 | 9/1965 | Edvardsen | 415/219 C |

FOREIGN PATENT DOCUMENTS

| | | | |
|---|---|---|---|
| 1066149 | 9/1959 | Fed. Rep. of Germany . | |
| 1258360 | 1/1968 | Fed. Rep. of Germany . | |
| 2742069 | 4/1978 | Fed. Rep. of Germany | 415/219 C |
| 221458 | 7/1968 | Sweden . | |
| 322758 | 8/1957 | Switzerland | 415/219 C |
| 791179 | 2/1958 | United Kingdom | 415/204 |

*Primary Examiner*—Louis J. Casaregola
*Attorney, Agent, or Firm*—Brumbaugh, Graves, Donohue & Raymond

[57] ABSTRACT

A stay vane ring for the spiral casing of a rotary hydraulic machine comprises two axially spaced-apart ring members disposed coaxially about the machine axis and a plurality of axially extending stay vanes connected between the ring members. Each ring member comprises a substantially cylindrical ring of metal plate and the axial ends of the stay vane plates are extended in axial direction on both sides of said cylindrical plate ring of the ring members at least substantially all the way out to the most distant circular edge of the cylindrical plate ring so that a cross-joint is formed between each stay vane plate and the cylindrical plate ring of each ring member. At each such cross-joint the stay vane plate and the cylindrical plate ring are welded to each other.

7 Claims, 5 Drawing Figures

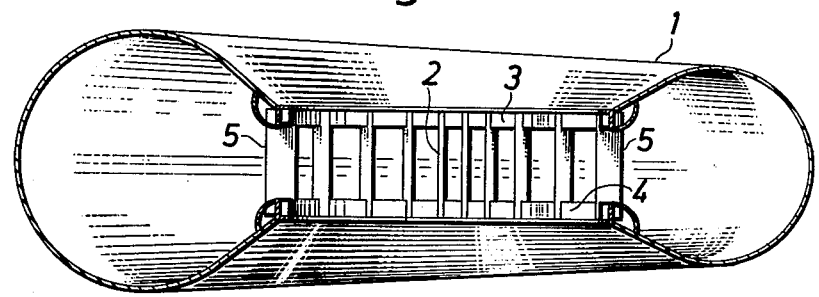
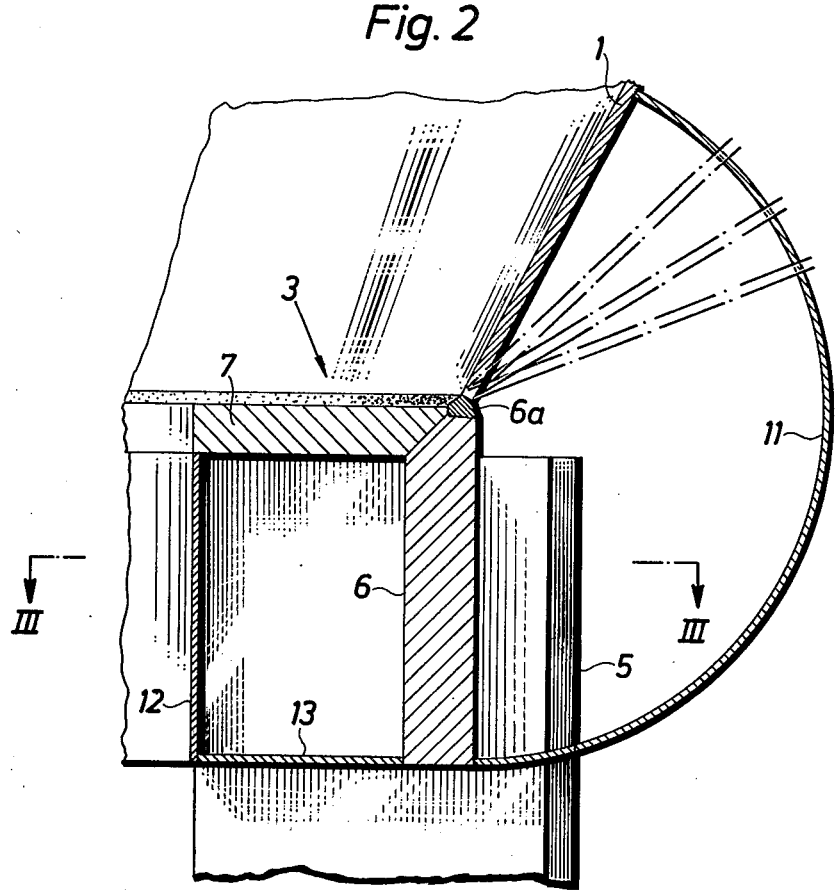

STAY RING FOR THE SPIRAL CASING OF A ROTARY HYDRAULIC MACHINE

This is a continuation of application Ser. No. 835,719, filed Sept. 22, 1977, abandoned.

BACKGROUND OF THE INVENTION

This invention relates to stay rings (also called speed rings) for the spiral casings of rotary hydraulic machines, such as hydraulic turbines, pump turbines and pumps.

A stay ring comprises generally two ring members disposed coaxially about the machine axis and spaced from each other axially of the machine, and axially extending stay vanes connected between said ring members. The ends of the metal plates of the spiral casing are joined to said ring members. Such a stay ring has as its objects to form a flow path for the fluid flow between the interior of the spiral casing and the guide vane ring, which is located radially inwardly of the stay ring, to secure the inner edges of the spiral casing and to absorb axial load forces from the guide vane ring and the turbine cover and sometimes also concrete weights.

Such stay rings are subjected to considerable forces originating, primarily, from the internal hydrostatic pressure acting on the walls of the spiral casing that is joined to the stay ring and, to a lesser extent, from the pressure within the stay ring itself and from the guide vane ring and/or the turbine cover which are connected to the stay ring. The forces due to loads imposed on the stay ring can be resolved, for purposes of analysis, into radial components perpendicular to the axes of the machine and axial components. The radial components produce internal circumferential tensile stresses in each of the two ring members of the stay ring, whereas the axial components produce internal axial tensile stresses in the stay vanes. It is important that the internal stresses in the various parts of the stay ring be distributed as uniformly as possible over the cross sections of these parts, in order to achieve an optimal utilization of the material and thereby reduce the dimensions of the parts and obtain substantial economical advantages as to the costs for the material and also the transport of the stay ring from the factory to the site of installation. In this connection, it should be noted that a reduction of the radial width of the stay ring results in a corresponding reduction of the total dimensions of the spiral casing located radially outside of the stay ring, which is also advantageous with respect to cost, weight, and transport.

Inasmuch as all forces acting upon the stay ring are initially imposed upon the two ring members of the stay ring, it is essential that the ring members and the connections between the walls of the spiral casing and the ring members and also between the ring members and the stay vanes be of such a design that the ring members can absorb such forces without any substantial bending, twisting or other distortion of the ring members and also transfer the axial components of such forces to the stay vanes as uniformly distributed as possible over the cross sections of the stay vanes.

With the foregoing objectives, stay rings of a welded construction have been suggested in the prior art (for instance in German Pat. Nos. 1 066 149 and 1 258 360 and Swedish Pat. No. 221 458). In the designs of these prior art welded stay rings, one objective has been to direct the forces from the spiral casing through the center of gravity of the cross section of the ring members and, in turn, to make the axial components of all external forces acting upon the ring members coincide as much as possible with the axes of the stay vanes. However, these known, so-called "balanced" stay rings of welded construction have several serious disadvantages. For example, in many of these prior art stay rings the ring members include metal plates which are subjected to very large tensile stresses in a direction perpendicular to the plane of the plates. It is well known that rolled metal plate inherently has a somewhat laminated structure parallel to its plane, wherefore there is a considerable risk of delamination of a metal plate when it is subjected to tensile stresses perpendicular to its plane. Moreover, there are often considerable stress concentrations at certain locations in many known stay rings. Also, in many of the prior art structures the ring members have an unsatisfactory rigidity or stiffness relative to bending and twisting or are of a comparatively complicated design, thus necessitating large amounts of welding, which is time consuming and expensive. In many cases, large parts of the welds are located in places that are not readily accessible, wherefore it is difficult to make the welds and check their quality in a satisfactory way.

SUMMARY OF THE INVENTION

A primary object of the present invention, therefore, is to provide a stay ring which fulfills the desired requirements and conditions in a more satisfactory manner than known stay rings.

According to the invention, that object is achieved with a stay ring comprising two axially spaced-apart ring members, each of which is disposed coaxially with the axis of the machine and is welded to the respective ends of the plates making up the spiral casing, and a plurality of axially extending stay vanes connected between these ring members. Each of the ring members comprises a substantially cylindrical ring of metal plate. The end edges of the plates of the spiral casing are welded to said plate rings along the circular edges of the plate rings facing away from the fluid flow path between the two ring members. The stay vanes, which are made of metal plates, are extended in axial directions on both sides of said cylindrical plate rings of the ring members, at least substantially, all the way out to said circular edge of the plate rings, whereby between each stay vane plate and the cylindrical plate ring of each ring member a cross-joint is formed, at which the stay vane plate and the plate ring are welded to each other.

As in the stay ring according to the invention each of the two ring members consists in principle of a single, substantially cylindrical ring of metal plate, the ring member is of a very simple design and, as a consequence, easy and inexpensive to manufacture and to join to the plates of the spiral casing. The cylindrical plate ring has also a high bending stiffness in the axial direction and this is advantageous, as it makes it possible to reduce the number of stay vanes. In a preferred embodiment of the invention the cylindrical plate ring of each ring member may be supplemented with a plane plate ring, which is perpendicular to the axis of the stay ring and which has its outer circumferential rim welded to the cylindrical plate ring preferably along the edge of the cylindrical plate ring, to which also the plates of the spiral casing are welded. Such a plane plate ring may have the double object of increasing the total cross-sectional area of the ring member, which absorbs the circumferential tensile stresses in the ring member, whereby the cross-sectional area of the cylindrical plate ring can be reduced, and of serving as a support surface for a guide vane ring or a turbine cover or a foundation which is located radially inwardly of the stay ring. The addition of such a plane plate ring to the cylindrical plate ring of each ring member causes only a very insignificant complication of the design of the ring member. As in the stay ring according to the invention the stay vane plates are extended in axial direction on both sides of the cylindrical plate rings of the two ring members substantially all the way out to the circular edges of the cylindrical plate rings to which the plates of the spiral casing are joined, it is achieved that the cylindrical plate rings will transfer the axial components of the forces from the spiral casing to the stay vanes in a very efficient manner and with a very uniform distribution over the entire cross sections of the stay vanes. Moreover, the welds between the cylindrical plate rings of the ring members and the stay vane plates are all easily accessible and extend axially, i.e. vertically when the stay vane is positioned with its axis vertical. This makes it possible to make all these welds using the automatic and advantageous electro slag welding method and without having to change the position of the stay ring between different welds.

In the following the invention is further described with reference to the accompanying drawings, which show some embodiments of the invention by way of example.

DESCRIPTION OF THE DRAWINGS

FIG. 1 is an axial cross-sectional view in schematic form of a spiral casing provided with a stay ring according to the invention;

FIG. 2 is a cross-sectional view, on a larger scale, of the upper part of the stay ring shown in FIG. 1;

DESCRIPTION OF THE EMBODIMENTS

Figure 3:
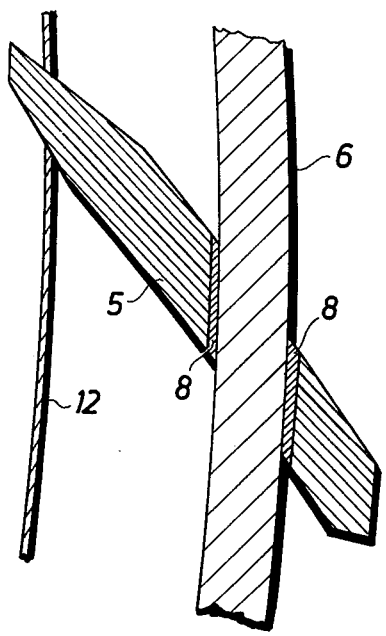
FIG. 3 is a sectional view along line III—III in FIG. 2, schematically illustrating a first embodiment of the cross-joints between the cylindrical plate ring and the stay vane plates.

FIG. 1 shows schematically a spiral casing 1 for a hydraulic turbine, pump turbine or pump. This spiral casing consists typically of a number of curved sections of metal plate welded to each other. The ends of each of the sections of the spiral casing are joined to a stay ring 2, which is coaxial relative to the machine axis and is located radially outwardly of the guide vane ring (not shown). The stay ring 2 consists of two axially-spaced ring members 3 and 4, disposed coaxially relative to the machine axis, and a number of axially extending stay vanes 5, interconnected between the two ring members. The stay vanes 5 are oblique to radial-axial planes in correspondence to the direction of fluid flow through the stay ring. The ends of the plate sections of the spiral casing 1 are welded to the upper ring member 3 and the lower ring member 4, respectively, along the circumference of the ring members.

The two ring members 3 and 4 of the stay ring are in all material respects the same, wherefore the following description of the construction of the upper ring member 3 is equally applicable to the lower ring member.

As can be most readily seen in FIG. 2, each of the ring members 3,4 of the stay ring according to the invention consists primarily of a substantially cylindrical ring 6 of heavy metal plate, which is coaxial relative to the axis of the stay ring. The ends of the plate sections of the spiral casing 1 are welded to the axially outer, circular edge 6a (the edge facing away from the fluid flow path through the stay ring) of the plate ring 6. The internal diameter of the spiral casing 1 varies along the circumference of the stay ring, wherefore the plate sections of the spiral casing 1 join the cylindrical plate ring 6 at angles that vary along the circumference of the stay ring, as indicated by dotted lines in FIG. 2.

In the preferred embodiment of the invention illustrated in the drawings, each of the two ring members 3 and 4 comprises, in addition to the cylindrical plate ring 6, also a plane, metal plate ring 7, which is perpendicular to the axis of the stay ring and is welded at its outer circumference to the axially outer edge of the cylindrical plate ring 6. One object of this plane metal plate ring 7 is to absorb part of the circumferential tensile stresses within the ring member 3, if it is impossible or impractical to give the cylindrical plate ring 6 alone a cross-sectional area sufficient, for this purpose. Moreover, the plane metal plate ring 7 may preferably serve as a support and mounting surface for the guide vane ring which is located radially inwardly of the stay ring or for a turbine cover or for a foundation.

The stay vanes 5, which are made of metal plate, are according to the invention extended in axial direction on both sides of the cylindrical plate ring 6 at least almost all the way out to the axially outer edge 6a of the ring 6, where the plate sections of the spiral casing 1 are welded to the ring 6. As a consequence and as most readily seen in FIGS. 3 to 5, cross-joints are formed between the cylindrical plate ring 6 and the stay vane plates 5, the axial extension of these cross-joints corresponding substantially to the axial height of the cylindrical plate ring 6. The plate ring 6 and the stay vane plates 5 are welded to each other at these cross-joints. It will be appreciated that these weld joints are easily accessible and all extend in the axial direction, i.e. in vertical direction when the stay ring is positioned with its axis vertical. As a result, these weld joints can without any difficulties be made with the aid of the very advantageous electro slag welding technique. It is also appreciated that the cylindrical plate ring 6 can be located in or very close to the cross-sectional centre of gravity of the stay vane plates 5, whereby the plate ring 6 will transfer the axial components of the forces from the spiral casing 1 to the stay vane plates 5 in a very efficient way and so that the internal stresses in the stay vane plates 5 are distributed as uniformly as possible over the cross-section of the stay vane plates. It will also be appreciated that neither the cylindrical plate ring 6 nor the plane metal plate ring 7 are subjected to any substantial tensile stresses perpendicular to the plane of the metal plates.

Figure 4:
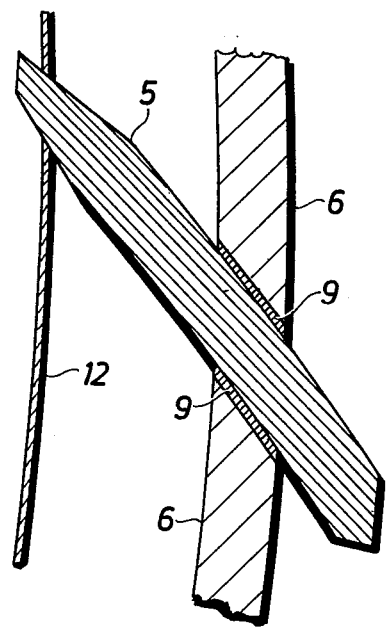
FIG. 4 is a sectional view, similar to the one in FIG. 3, schematically illustrating a second embodiment of the cross-joints between the cylindrical plate ring and the stay vane plates.
Figure 5:
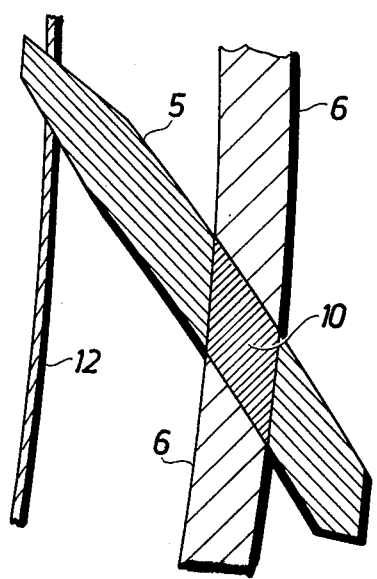
FIG. 5 is a sectional view, similar to the one in FIG. 3, schematically illustrating a third embodiment of the cross-joints between the cylindrical plate ring and the stay vane plates.

For the cross-joints between the cylindrical plate ring 6 and the stay vane plates 5 various forms are possible, as illustrated in FIGS. 3 to 5.

In the embodiment illustrated schematically in FIG. 3, the end of the stay vane plate 5 is provided with an axially extending slot or notch 8 which is somewhat wider than the thickness of the cylindrical plate ring 6 and through which the plate ring 6 extends uninterrupted. Thus, on both sides of the cylindrical plate ring 6 there are clearances within the slot 8 in the stay vane plate 5, in which clearances welds can be made by electro slag welding.

The embodiment schematically illustrated in FIG. 4 is in principle the opposite to the embodiment according to FIG. 3. In the embodiment according to FIG. 4 the substantially cylindrical plate ring 6 is provided with an interruption at the location of each stay vane plate 5, which extends uninterrupted through said interruption in the plate ring 6. Thus, the substantially cylindrical plate ring 6 consists of a number of plate sections or plate segments, each extending between two adjacent stay vanes 5 and having its ends welded to the side surfaces of the stay vane plates by weld joints 9, which can preferably be made by electro slag welding.

In the embodiment illustrated in FIG. 5 the stay vane plates 5 are provided with a slot or notch in a manner similar to that shown in FIG. 3 and, moreover, the substantially cylindrical plate ring 6 is provided with interruptions substantially in the same way as in the embodiment according to FIG. 4. As a result, at the crossing between the cylindrical plate ring 6 and a stay vane plate 5 an axially elongated and in cross section substantially four-sided cavity 10 is formed, which is filled with weld material. Also this weld joint can preferably be made by electro slag welding.

All the embodiments of the cross-joints between the cylindrical plate ring 6 and the stay vane plates 5, which are illustrated in FIGS. 3 to 5, as well as other possible modifications of these embodiments are very advantageous with respect to the welding work.

The portion of the end surface of each stay vane plate 5 which is located radially inwardly of the cylindrical plate ring 6, is preferably welded to the adjacent surface of the plane metal plate ring 7.

11 in the drawings designates a thin flow guide plate, the only object of which is to improve the fluid flow through the stay ring and which is of no importance to the structural strength of the stay ring. This flow guide may be provided with openings so that the hydrostatic pressure is equalized on opposite sides thereof. Moreover, similar thin plates 12 and 13 are provided, which also are of no importance to the structural strength and the object of which is to shield the enclosed space from the fluid flow through the stay ring. Also these plates 12 and 13 may preferably be provided with openings so that the hydrostatic pressure is equalized on opposite sides thereof.

It should be noted that, as well known from prior art stay rings, the stay ring according to the invention may, particularly when of a large diameter, be manufactured in a number of separate peripheral sections, each being an arc of a circle, which are joined to each other, e.g. by means of bolts, at the site of installation to form the complete stay ring.

We claim:

1. A stay ring for a hydraulic machine having a spiral casing formed of metal plates, said stay ring comprising two cylindrical ring members disposed coaxially about the machine axis and spaced apart along said axis to define a fluid flow path therebetween and a plurality of axially extending stay vanes made of metal plate, wherein each of the stay vanes intersects with each said ring member to lie radially on both sides of the ring member and extends axially at least substantially to the circular edge of the ring member axially remote from the other ring member, wherein axially extending welded cross-joints are formed where said stay vanes intersect with said ring members, and wherein the ends of the metal plates forming the spiral casing are welded to said cylindrical ring members along the axially remote circular edges such that stresses imparted to said casing are transmitted to said ring members and are not directly imparted to said stay vanes.

2. A stay ring as claimed in claim 1, wherein each stay vane is provided with an axially extended slot in each axial end of the stay vane through which slot the associated ring member extends uninterrupted at said cross-joint.

3. A stay ring as claimed in claim 1, wherein each ring member is provided with an interruption at each stay vane, the stay vane projecting into said interruption at said cross-joint.

4. A stay ring as claimed in claim 1, wherein at each of said cross-joints between a stay vane and one of the ring members, the stay vane is provided with an axially extended slot substantially corresponding to the cross section of the cylindrical ring member and the cylindrical ring member is provided with an interruption substantially corresponding to the thickness of the stay vane, whereby an axially elongated and in cross section substantially four-sided cavity enclosed by said cylindrical ring member and said stay vane is formed, which cavity is filled with weld material.

5. A stay ring as claimed in claim 1 comprising a pair of planar rings which are perpendicular to the machine axis and have an outer diameter corresponding to the diameter of said cylindrical ring members, wherein one of said planar rings is welded to each ring member along the outer circumferencial edge of said planar ring.

6. A stay ring as claimed in claim 5, wherein said planar rings are welded to said cylindrical ring members along said axially remote circular edges, and the axial ends of the stay vanes are welded to the surfaces of said planar rings facing the stay vanes.

7. A stay ring as claimed in claim 5, wherein each said planar ring provides an annular support surface adapted to engage an adjacent component of a rotary hydraulic machine installation.

* * * * *